C. PERRIN.
Interchangeable Gearing for Grain-Drill.

No. 209,833.                  Patented Nov. 12, 1878.

Witnesses:
Alexander Mahon
John G. Center

Inventor:
Charles Perrin,
by A. M. Smith,
Attorney

N. PETERS, PHOTO-LITHOGRAPHER, WASHINGTON, D. C.

UNITED STATES PATENT OFFICE.

CHARLES PERRIN, OF SPRINGFIELD, OHIO.

IMPROVEMENT IN INTERCHANGEABLE GEARING FOR GRAIN-DRILLS.

Specification forming part of Letters Patent No. 209,833, dated November 12, 1878; application filed October 21, 1878.

*To all whom it may concern:*

Be it known that I, CHARLES PERRIN, of Springfield, county of Clarke, State of Ohio, have invented a new and useful Improvement in Interchangeable Gearing for Grain-Drills and other machines, of which the following is a full, clear, and exact description, reference being had to the accompanying drawing, making part of this specification, in which—

Figure 1:
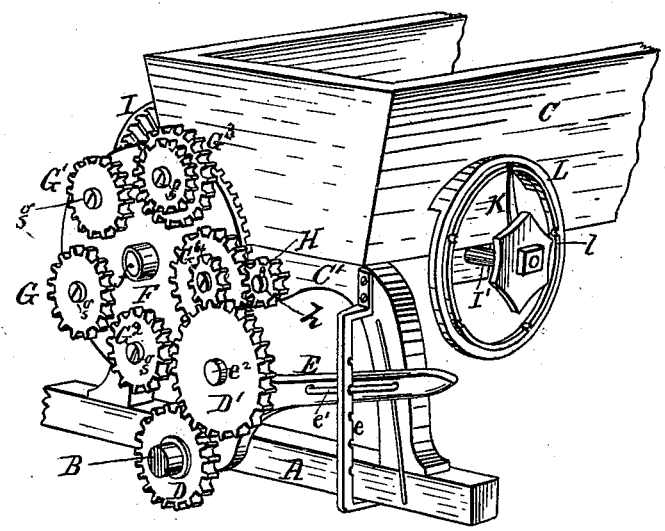
Figure 2:
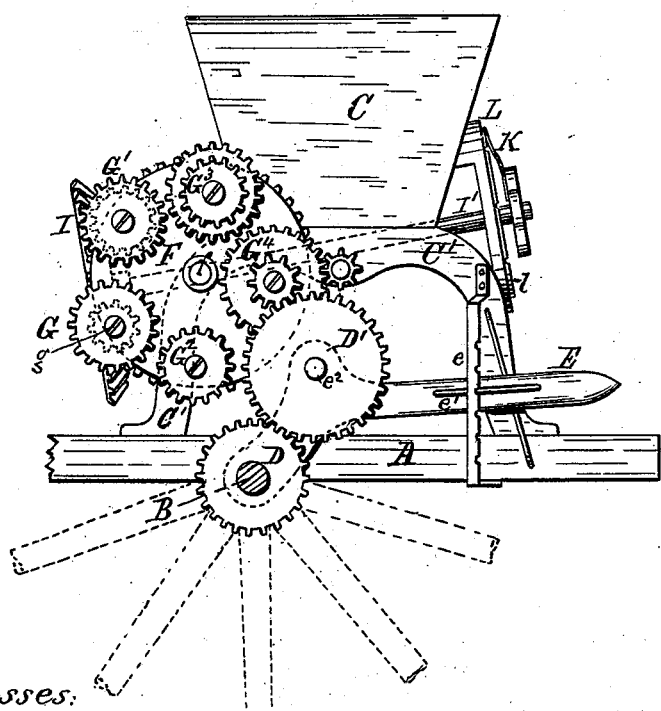

Figure 1 is a perspective view of so much of a grain-drill as is necessary to show my invention, and Fig. 2 is a side elevation of the same.

Similar letters of reference denote the same parts in both figures.

My invention has reference more particularly to the improvement of grain-drills, the object being to adapt the distributing-wheel shaft to be driven at different rates of speed for varying the quantity of grain or seed sown per acre without necessitating the removal of any portion of the transmitting or multiplying gearing from the machine; but it will be apparent that the improvement may be applied to other machines where similar changes of speed are required to adapt them to the work to be done.

The invention consists, first, in the employment of a number of double gears of varying diameters interposed between the ground or driving wheel and the driven or distributer wheel shaft, and arranged upon a disk, by the rotation or adjustment of which any one of said gears may be brought into action for driving the distributer-wheel shaft, as desired.

It further consists in a novel means for effecting the adjustment of the disk or wheel carrying the several interchangeable gears, and to the arrangement of devices connected therewith for indicating the adjustment of the disk and its gears and the quantity sown per acre under the different adjustments, as hereinafter explained.

In the accompanying drawings, A represents a portion of the frame of a grain-drill, B the main drive-wheel axle on which said frame is mounted, and C the grain-box or seed-hopper, said parts being constructed and arranged in any usual or preferred manner.

D is a driving spur-gear, ordinarily attached to and moving with one of the ground-wheels; but where a rotating shaft or axle is employed said wheel may be keyed to and driven by said shaft or axle, if desired.

Upon the axle-shaft B is mounted an adjustable lever-plate, E, moving upon said axle as a center, and held at any desired adjustment by means of a notched rack-bar, $e$, and a spring-latch, $e^1$, attached to the lever engaging therewith. Upon a stub-shaft at $e^2$ on this lever-plate is mounted a transmitting wheel or pinion, D', which moves with the lever E around the shaft B as a center, remaining always in gear with and receiving motion from the wheel.

The end plate or standard C' for the grain-box (or other suitable support on the machine) is provided with a second stub-axle, $f$, upon which is mounted an adjustable disk or bevel-wheel, F, provided on its outer vertical face with a series or circle of short pins or stub-axles, $g$, arranged near its periphery, and upon which are mounted a series of double-gear wheels, G G$^1$ G$^2$, &c., said double gears being of different relative diameters, as shown. These double gears are so arranged that by the rotation or adjustment of the disk F the outer one of any pair may be brought into position to engage with the transmitting-wheel D', properly adjusted by means of the lever-plate E, and when so adjusted the inner gear of the pair will be in position to engage with a pinion, H, on the distributer-wheel shaft $h$, the double gear G$^4$, which gives the highest rate of speed to said shaft, being represented in the drawing under the adjustment described.

The inner gears of the double wheels, engaging, as they do, with the non-adjustable driven gear H on the distributer-wheel shaft, are necessarily so arranged as that the outer portion of the respective circles described by their teeth will be equidistant from the center of the disk F, to adapt them to engage with the pinion H. This necessity would, of course, be obviated by making the shafts of the disk F and pinion H relatively adjustable.

The differences in diameter of the outer gears are compensated for by the adjustment of the transmitting-wheel D', as explained. In the double gear G, the motion being received by a large gear and imparted therefrom to the pinion H through a small gear, (shown in dotted lines,) a slow motion of the driven shaft is obtained, the varying diameters of the different wheels giving an increasing rate of speed up to $G^4$, giving the highest rate, as explained.

The disk F on its inner face is made in the form of a crown or bevel wheel, and engages with a wheel, I, on one end of a shaft, I', which extends horizontally under the grain-box, and is provided on its opposite end with an index-lever, K, moving over a registered dial-plate, L, the numbers on which indicate which of the wheels G $G^1$, &c., is in gear, or the quantity of seed sown per acre with the index-lever in any given position, either or both, as may be preferred.

The notches in the rack-bar e may be correspondingly numbered, and when the lever-plate is set at any given number the attendant, by rotating the lever K to the corresponding number on the dial-plate L, will cause the rotation of the shaft I', bevel-wheel I, and disk F, to bring the double gear corresponding with such number into mesh with the transmitting-pinion D' and pinion H, for driving the latter and its shaft with the required velocity.

The lever K may be made in the form of a spring, or it may be provided with a spring-latch engaging with notches in a ring or flange, l, on the dial-plate, for holding it, and with it the disk F, at the desired adjustment.

Parts of the machine not particularly described may be of any usual or preferred construction and arrangement.

Having now described my invention, what I claim as new, and desire to secure by Letters Patent, is—

1. The revolving disk or wheel provided with the series of double gears of different or varying diameters, substantially as and for the purpose set forth.

2. A series of interchangeable double gears intermediate between the driving-wheel and distributer or driven wheel shaft, any one of which gears may be brought into action without removing the others from the machine, substantially as described.

3. The revolving disk, carrying the series of interchangeable double gears, in combination with the adjustable transmitting-wheel D, substantially as described.

4. The revolving disk F, provided with the series of double gears of varying diameters, as described, in combination with the bevel-wheel I, shaft I', and index-lever K, or equivalent devices for effecting the adjustment of said disk, substantially as and for the purpose set forth.

In testimony whereof I have hereunto set my hand this 15th day of October, A. D. 1878.

CHAS. PERRIN.

Witnesses:
SIDNEY F. SMITH,
ANDREW T. BYERS.